United States Patent Office 3,004,825
Patented Oct. 17, 1961

3,004,825
PROCESS FOR MANUFACTURE OF SODIUM
HYDROSULFITE
Jonas Kamlet, New York, N.Y., assignor to National Distillers and Chemical Corporation, New York, N.Y., a corporation of Virginia
No Drawing. Filed Feb. 24, 1958, Ser. No. 716,861
3 Claims. (Cl. 23—116)

This invention broadly relates to a process for the manufacture of sodium hydrosulfite. More particularly, it relates to an improved process whereby sodium hydrosulfite may be prepared from cheap and readily available raw materials.

Sodium hydrosulfite is a widely used industrial chemical. Its many uses include applications in which it functions as a reducing agent, as a vatting agent for indigoid and other types of vattable dyes, as a bleaching agent for soap, paper and paper pulp, straw and other cellulosic raw materials and in the preparation of pharmaceuticals and organic intermediates.

At the present time, sodium hydrosulfite is manufactured commercially by the reaction of sulfur dioxide with zinc dust to form zinc hydrosulfite and reaction of the latter with sodium hydroxide or sodium carbonate. Other methods which have been suggested include reaction of sodium bisulfite and sulfur dioxide with formic acid and sodium formate, and reduction of sodium bisulfite and sulfur dioxide with sodium amalgam.

It has now been discovered that sodium hydrosulfite is obtained readily and in good yield by the reaction of diluted, gaseous sulfur dioxide with solid, powdered sodium hydride, at temperatures between about —50 up to 100° C. It is believed that an unstable addition compound is formed by said reaction which addition compound is converted to sodium hydrosulfite dihydrate by solution in water, followed by crystallization. For obtaining good yields of sodium hydrosulfite, it is necessary that the reaction be carried out under controlled conditions.

Thus, when sulfur dioxide is passed over sodium hydride at normal temperatures and pressures, the gas is rapidly absorbed by the sodium hydride, with evolution of large amounts of heat. Unless the temperature is controlled, the exothermic reaction may cause the sodium hydride to ignite. Any yields of sodium hydrosulfite obtained by this reaction of sodium hydride with undiluted sulfur dioxide are very poor. However, when the sulfur dioxide is diluted with an inert gas, the exothermicity of the reaction is moderated, resulting in a controllable reaction. With mixtures containing more than 50% sulfur dioxide, it is difficult to prevent excessive heating of the sodium hydride and poor yields of the sodium hydrosulfite are obtained. However, if mixtures containing from 5% to 50% of sulfur dioxide, the remainder being an inert gas, are used, the temperature of the reaction may be sufficiently moderated by exterior cooling of the reaction vessel. It is desirable to maintain the reaction temperature of the mixture below about 100° C., to obtain good yields of sodium hydrosulfite. Thus, for example, with a gas mixture containing 10% of $SO_2$ and 90% of an inert gas, the uptake of the $SO_2$ by the sodium hydride is relatively moderate and it is not difficult to control the reaction temperature, by exterior cooling of the reaction vessel, within the desired range of 0°–40° C., and preferably between 20° and 30° C. Operating in this manner, it has been found that an 80% sodium hydrosulfite is obtained from sodium hydride and a gaseous mixture of nine parts hydrogen and one part of sulfur dioxide.

The inert gaseous diluents which may be used in the process of this invention include hydrogen, nitrogen, helium, neon and argon. Carbon dioxide and air may not be used since they will react vigorously with the sodium hydride to form sodium formate and other products. Thus, the inert gas may be any one or mixtures thereof which are gaseous at the temperatures employed and which are relatively inert to both the reactants and the products at the temperatures employed. Since hydrogen is evolved during the interaction of the sodium hydride with the diluted sulfur dioxide, it is preferred to use hydrogen as the diluent for the sulfur dioxide.

Thus, in practice, a mixture containing 5% to 50% of sulfur dioxide, the remainder being hydrogen (all proportions being expressed by volume) is passed over sodium hydride in a rotary kiln reactor, the temperature being maintained, by outside cooling of the reactor, if necessary, at under about 100° C. As the sulfur dioxide is absorbed, hydrogen is evolved. The unreacted gases can be recovered, made up to the appropriate concentration with fresh sulfur dioxide, and recycled to the reactor. An excellent utilization of the sulfur dioxide is thus obtained. Since the circulating gas mixture is actually enriched in hydrogen content after repeated cycles, no additional hydrogen need be added on recycling. Thus, in practice, it is found feasible to start the process with a mixture of sulfur dioxide and hydrogen, and to circulate this gas mixture over the sodium hydroxide, adding after each cycle a quantity of sulfur dioxide gas substantially equivalent to the sulfur dioxide reacted in the said cycle with the sodium hydride. This will reconstitute the gas mixture to the original composition, whereby it is rendered suitable for subsequent recycling.

The process of this invention may be effected in any suitable reaction vessel adapted for carrying out a typical gas-solid interaction. However, it is preferred to employ a reactor of the rotary type provided with circular rims, rotatably carried by flanged wheels. The usual mechanical provisions may be made for driving the said flanged wheels. Inasmuch as the reaction of the sodium hydride with the diluted sulfur dioxide is moderately exothermic, it is also desirable to provide for a means of controlled cooling of the said rotary reactor. This may be done, for example, by means of a jacket on the said reactor through which cooling air is passed or by any other convenient and well-known method.

In order to effect the most rapid and complete interaction of the sodium hydride with the sulfur dioxide, it is also desirable to rotate or otherwise agitate the reactor during the passage of the gas over the solid sodium hydride. The rate of rotation and the size of the reactor is dependent on its design and may be varied over wide limits.

After a substantial part, for example 50%, of the sodium hydride has reacted with the diluted sulfur dioxide, the reaction mixture is dissolved in a small volume of cold water. The unstable reaction product of the sodium hydride and the sulfur dioxide is thereupon converted to sodium hydrosulfite. The course of the reaction may be followed by periodic withdrawals of samples of the reacting mixture, followed by solution of said samples in cold water. The resultant solution may then be titrated for sodium hydrosulfite content. It is also feasible to follow the course of the reaction of the sodium hydride and the sulfur dioxide by measuring the amount of hydrogen evolved when said samples are dissolved in the water. As the sodium hydride is consumed, the amount of hydrogen evolved will diminish. As a rule, any difference in the sodium hydrosulfite determined by titration and the sodium hydride theoretically present and that accountable for by the volume of hydrogen evolved may be attributable to the minor amounts of by-products, other than sodium hydrosulfite, formed during the interaction.

From the aqueous solution of sodium hydrosulfite thus obtained by dissolution in water, the sodium hydrosulfite dihydrate may be recovered and converted to anhydrous sodium hydrosulfite by the well-known and conventional processes of the prior art. This involves precipitating the sodium hydrosulfite with salt and alcohol, decanting or filtering off the resultant crystals and dehydrating these with direct steam at about 65° C., after which they are washed with alcohol and dried in vacuum tray cabinets at 80°–90° C.

The following example is presented only to illustrate this invention, and it is intended in no way to limit it as to the reagents, proportions or conditions described therein. Obvious modifications will occur to persons skilled in the art.

Example I

A rotary reaction vessel, fitted with means for both rotation and cooling, is charged with 24 parts by weight (1 mole) of finely powdered (60–100 mesh) sodium hydride. It is desirable that the reactor be no more than about one-quarter filled with the sodium hydride. A mixture of 10% of sulfur dioxide (by volume) and 90% hydrogen (by volume) is passed over the rotating sodium hydride in the reactor at the rate of 320 parts by volume per minute. Samples withdrawn from the reaction vessel at periodic time intervals show the following conversions to sodium hydrosulfite and unreacted sodium hydride:

| Time, hrs. | Sodium Hydrosulfite, percent | Sodium Hydride, percent |
|---|---|---|
| 4 | 15.1 | 83.2 |
| 8 | 27.4 | 69.6 |
| 12 | 40.6 | 51.1 |
| 16 | 56.2 | 34.2 |
| 20 | 69.6 | 20.0 |
| 24 | 81.4 | 7.0 |
| 28 | 66.6 | 6.2 |

The above results were obtained by solution of the sample in water, followed by titration of the sodium hydrosulfite and measurement of the hydrogen evolved. Thus, since conversion to sodium hydrosulfite seems to reach a maximum in 24 hours, it is desirable to interrupt the reaction after this period. However, the duration of the reaction and the time required for obtaining of maximum yields may vary and is dependent on the reactor size and design, concentration of sulfur dioxide in the diluted gas and other factors. During the entire reaction, it is desirable to maintain the temperature of the sodium hydride and the sodium hydrosulfite formed therefrom in the reactor at 0° to 40° C., and preferably between 20° and 30° C. by appropriate cooling of the exterior surfaces of the rotating reactor.

At the conclusion of the reaction, the reaction mixture is carefully dissolved in 40 parts by weight of a mixture of ice and water. Sodium hydrosulfite dihydrate and anhydrous sodium hydrosulfite are then isolated from the resultant solution by the well-known processes of the prior art.

One such method is carried out in the following manner. The solution of sodium hydrosulfite in water (preferably about 15–20%) is treated with about 250–300 parts of absolute ethanol and 120 parts of sodium chloride per 100 parts of sodium hydrosulfite. The mixture is stirred one hour, then allowed to stand one hour. Approximately two-thirds of the mother liquor is then removed by filtration. The residue is treated with 1 to 2 parts of sodium chloride and 1 to 2 parts of sodium hydroxide per 100 parts of hydrosulfite, then rapidly heated to 65° C. and held at that temperature for five minutes. The remaining mother liquor is then immediately removed by filtration. The precipitate is washed with ethanol, then again filtered and dried at 60° C. under reduced pressure for one hour. Some care is taken to avoid contact with the air throughout the entire operation.

What is claimed is:

1. A process for preparation of sodium hydrosulfite which comprises reacting finely-divided sodium hydride with a gaseous mixture of about 10 percent by volume of sulfur dioxide and about 90 percent by volume of an inert gas at a temperature below about 100° C. with agitation, whereby hydrogen is evolved and an unstable addition compound of sodium and sulfur dioxide is formed, dissolving the said unstable addition compound in cold water to form an aqueous solution of sodium hydrosulfite, salting out the said sodium hydrosulfite as the dihydrate $Na_2S_2O_4 \cdot 2H_2O$, and dehydrating said dihydrate to anhydrous sodium hydrosulfite.

2. The process as described in claim 1 wherein the inert gas is hydrogen.

3. The process as described in claim 1 wherein the particle size of the sodium hydride is about 60 to about 100 mesh.

References Cited in the file of this patent

UNITED STATES PATENTS 1,699,393    Hagens et al.             Jan. 15, 1929

OTHER REFERENCES

Mellor: "A Comprehensive Treatise on Inorganic and Theoretical Chemistry," vol. 10, 1930, Longmans, Green & Co., N.Y., pages 181–182.